E. R. BROWN ET AL

THREAD PROTECTOR AND METHOD OF APPLYING THE SAME
THREAD PROTECTOR

Sept. 8, 1931. Re. 18,184

Original Filed Nov. 2, 1927

INVENTOR
Ernest R. Brown
Porter S. Brown
by their attys.
Byron Stokes & Kenyon

Reissued Sept. 8, 1931

Re. 18,184

UNITED STATES PATENT OFFICE

ERNEST R. BROWN AND PORTER S. BROWN, OF WILKINSBORO, PENNSYLVANIA

THREAD PROTECTOR

Original No. 1,708,657, dated April 9, 1929, Serial No. 230,489, filed November 2, 1927. Application for reissue filed March 18, 1931. Serial No. 523,608.

Our invention relates to thread protectors, and particularly to thread protectors for preserving threads formed on commercial sizes of pipe during transportation.

The cutting of threads on pipe after the pipe has been transported to its place of use involves a considerable expense in labor, and frequently results in delay to other work. Accordingly, pipe manufacturers frequently form threads on such pipe during the process of manufacture and ship the threaded pipe in bulk. Where the pipe is of large size, such as is used for drilling wells and the like, the weight of the pipe lengths is considerable. Where a large number of such pipes are piled in bulk either in stock or in transit, difficulty has been encountered in preserving the threads during collisions between the pipes. Because of the great weight imposed upon well pipe and the necessity for occasionally coupling and uncoupling such pipes while in a well, small imperfections in the threads constitute a serious objection to the use of such pipe after its arrival in the field. Accordingly, metal caps have heretofore been screwed over the threads of the pipes for protecting them.

As the freight rates on finished pipes are rather high, the additional weight of metal caps has contributed materially to the cost of transporting such pipe, particularly in the larger sizes. Threading protectors onto the pipe ends has involved additional time and expense in the manufacture of such pipes. Thread protectors, as heretofore made, which are easily placed on the pipe threads, are liable to fall off during transportation.

We provide a thread protector having a body of resilient material such as rubber, rubber composition and the like, having a resilient metal reinforcing member embedded therein. The faces of the protector are provided with incomplete or stub threads for engaging the threads on the pipe. Our protector is sufficiently flexible to permit its being driven over the ends of the pipe, as distinguished from being screwed thereon for seating the stub threads in the pipe threads. At the same time it is sufficiently rigid to prevent its loosening during the transportation of the pipe to which it is attached. Protection to the pipe threads is afforded by the resilient character of the material in the protector.

Our thread protector is cheaply manufactured by forming a resilient composition about a resilient metal frame. Different forms of the protector are adaptable for use with either internally or externally threaded pipes by changing the stub teeth from the outer to the inner surface of the protector and by providing an outturned or inturned flange for engaging the pipe end, respectively.

The accompanying drawings illustrate a present preferred embodiment of the invention, in which Fig. 1 is a transverse sectional view of a thread protector embodying our invention;

Figure 1:
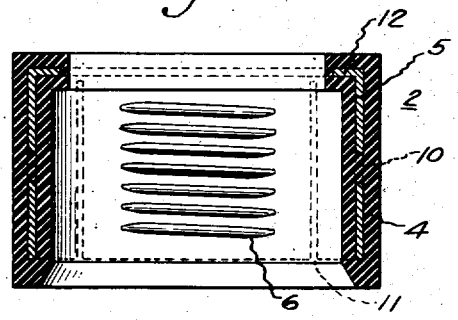
Figure 3:
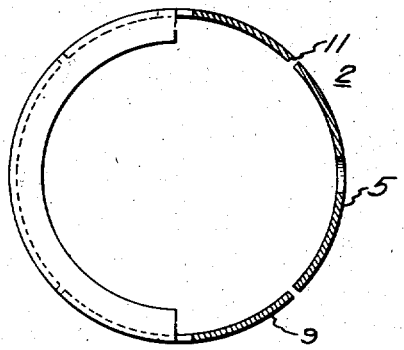
Fig. 3 is a plan view, partially in section, of the reinforcement for the pipe protector.
Figure 2:
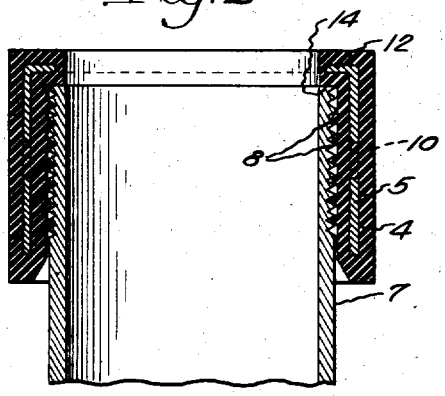
Fig. 2 is a transverse sectional view of the protector applied to an externally threaded pipe.
Figure 4:
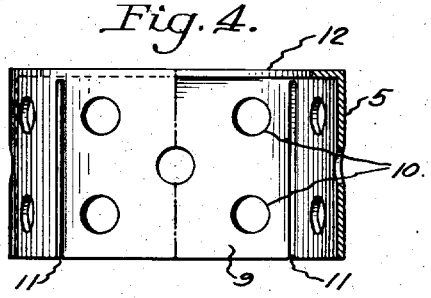
Fig. 4 is an elevational view, partially in section, of the reinforcement shown in Fig. 3.

Referring to Figs. 1 to 4, inclusive, the pipe thread protector is constituted by a body 4 of resilient material having a metallic reinforcing member 5 embedded therein. One form of resilient material 4 is rubber or a rubber composition, although it is to be understood that other types of resilient material may be substituted for the rubber or rubber composition.

For engaging externally threaded pipe, the inner face of the resilient material 4 is provided with threads 6. To permit the threads to slide over pipe threads they are preferably made as incomplete or stub threads arranged in groups about the inner walls of the protector.

The application of the protector to a pipe 7 is secured by pushing the protector 2 over the ends of the pipe 7, as distinguished from screwing it onto the pipe. When so applied, the stub threads 6 slip past threads 8 on the pipe 7 and come to rest between certain of them. The stub threads 6 are disposed at a distance from the end of the thread protector encircling the pipe in order that blows delivered to the ends of the thread protectors, such as are incident to the parallel movement of pipes in transit, produce a compressive effect in the pipe thread protector before the blows are transmitted to the threads. This construction reduces the tendency for threads to become dislodged by reason of longitudinal blows. Where the threads are disposed near the end of the protector longitudinal blows tend to loosen them and push the protector off the pipe. To remove the protector, it is turned to unscrew the stub threads 6 from engagement with the pipe threads 8.

Protection from blows to the pipe threads 8 is obtained by reason of the resilient nature of the composition 4. The force of a blow delivered to the outer surface of the protector 2 is partly dissipated by compressing the material 4 rather than by transmitting the blow directly to the threads 8. Additional protection and rigidity is imparted to the composition 4 by the reinforcing member 5. The reinforcing member 5 is in the form of a metallic cylinder having a side wall 9 provided with perforations 10 and slits 11. Bonds between the composition 4 on the external and internal surfaces of the reinforcing member 5 are formed by the portions of the material of the composition 4 extending through the openings 10 and slots 9. Resiliency of the reinforcing member 5 is secured by the presence of the slits 11.

The sheet metal between the slits constitutes independently movable fingers which form a yielding expansible skirt which permits the protector to adjust itself to the size of the threaded end of the pipe when the protector is driven onto the pipe end.

Protection to the outer end of the pipe is secured by a flange 12 formed on the reinforcing member 5 and extending inwardly and beyond the end 14 of the pipe 7. Flange 12 is embedded in the composition 4.

Figure 6:
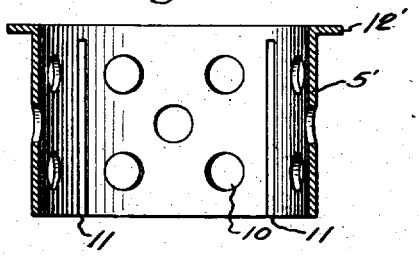
Fig. 6 is a transverse sectional view of the reinforcement for the thread protector shown in Fig. 5.
Figure 5:
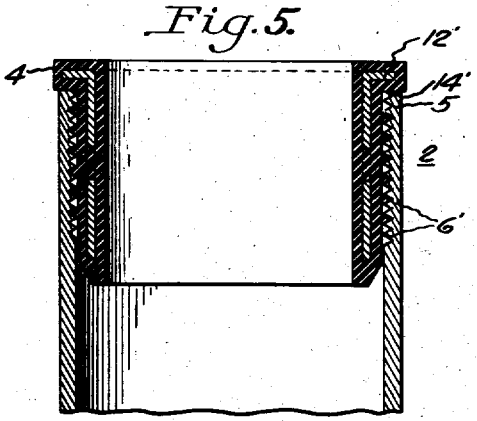
Fig. 5 is a transverse sectional view of a thread protector applied to an internally threaded pipe.

Referring to Figs. 5 and 6, a modified form of protector 2 is applicable to internally threaded pipe by providing stub teeth 6′ on the outer surface thereof. A flange 12′ extends outwardly beyond the end 14′ of the pipe. The construction of this modification of our invention is otherwise the same as that shown in Figs. 1 to 4, inclusive.

While we have illustrated and described the present preferred modifications of our invention, it will be understood that it may be otherwise embodied or practiced within the scope of the following claims.

We claim:

1. A thread protector comprising a body portion of resilient material, threads formed on a surface of the body portion, and a circumferentially extending reinforcing member having slits formed therein embedded in the body portion with portions of the body portion disposed on both sides of the reinforcing member.

2. A thread protector comprising a body portion of resilient material, threads formed on a surface of the body portion, and a reinforcing member having independently movable sections embedded in the body portion with portions of the body portion disposed on both sides of the reinforcing member.

3. A thread protector comprising a body portion of rubber-like material, a thread engaging surface on the body portion, and a reinforcing member having independently movable sections embedded in the body portion with portions of the body portion disposed on both sides of the reinforcing member.

4. A thread protector comprising a body portion of resilient rubber-like material, a thread engaging surface on the body portion, and a circumferentially extending reinforcing member having holes formed therein and slit so as to form independently movable sections embedded in the body portion with portions of the body portion disposed on both sides of the reinforcing member, said portions being bonded through the holes and the slits.

5. A thread protector comprising a body portion of rubber-like material and a cylindrical reinforcing and stiffening frame embedded in the body portion having a flange at one end adapted to overlie the end of the member to be protected and having slits extending inwardly from its other end to form independently movable fingers, portions of the body portion being disposed on both sides of the reinforcing member.

6. A thread protector comprising a sheet metal reinforcing and stiffening shell having a flange at one end adapted to overlie the end of the member to be protected and having slits extending inwardly from its other end to form independently movable fingers and a rubber-like cushion enclosing the reinforcing shell on both sides thereof.

7. A thread protector comprising a sheet metal reinforcing and stiffening shell having a flange at one end adapted to overlie the end of the member to be protected and having slits extending inwardly from its other end to form independently movable fingers and a rubber-like cushion enclosing the reinforcing shell on both sides thereof, whereby the rubber-like cushion on the outside of the protector cushions external shocks, the sheet metal reinforcing and stiffening shell distributes said shocks and the inside of the rubber-like cushion further cushions said distributed shocks.

8. A thread protector comprising a sheet material reinforcing and stiffening shell having a flange at one end adapted to overlie the end of the member to be protected and having slits extending inwardly from its other end to form independently movable fingers and a rubber-like cushion enclosing the reinforcing shell on both sides thereof, the portions of the cushion on opposite sides of the sheet being bonded together through the slits, whereby the rubber-like cushion on the outside of the protector cushions external shocks, the sheet metal reinforcing and stiffening shell distributes said shocks and the inside of the rubber-like cushion further cushions said distributed shocks.

9. A thread protector comprising a generally cylindrical body portion of rubber-like material, a thread engaging surface on the body portion, and a generally cylindrical sheet metal reinforcing member embedded in the body portion with portions of the rubber-like body portion disposed on both sides of the reinforcing member, a part of the reinforcing member constituting a yielding skirt which adjusts itself to the size of the threaded end of the article to be protected when the protector is applied thereto.

10. A protector for the ends of tubes and the like, comprising a generally cylindrical body portion of rubber-like material, and a generally cylindrical metallic reinforcing member embedded in the body portion, with portions of the body portion disposed on both sides of the reinforcing member, said reinforcing member being yieldable to permit the protector to adjust itself to the size of the ends of tubes and the like to be protected.

11. A protector for the ends of tubes and the like, comprising a generally cylindrical body portion of rubber-like material, and a generally cylindrical reinforcing member embedded in the body portion with portions of the body portion disposed on both sides of the reinforcing member, the reinforcing member being slit so as to form an expansible skirt at one end thereof.

12. A thread protector comprising a sheet metal reinforcing and stiffening shell having a cylindrical skirt adapted to surround and overlie the threads to be protected and having the end of the shell beyond the skirt bent inwardly to extend over the end of the member to be protected, and a cushion of soft yieldable rubber-like material enclosing both the skirt and flange portions of the sheet metal shell on all sides thereof, whereby the rubber-like cushion on the exposed surface of the protector cushions external shocks, the sheet metal reinforcing and stiffening member arrests and distributes said shocks, and the rubber-like cushion in engagement with the threads and the end of the member further cushions said distributed shocks.

In testimony whereof, we have hereunto set our hands this 16th day of March, 1931.

ERNEST R. BROWN.
PORTER S. BROWN.